United States Patent
Verhaeghe et al.

(10) Patent No.: US 7,584,696 B2
(45) Date of Patent: Sep. 8, 2009

(54) AGRICULTURAL BALERS

(75) Inventors: Didier O. M. Verhaeghe, Houthulst (BE); Niklaas G. C. Monteyne, Blankenberge (BE); Adrianus Naaktgeboren, Varsenare (BE); Olivier Vanhercke, Nieuwpoort (BE); Johan A. E. Vande Ryse, Brugge (BE); Stefan De Rycke, Zulte (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/941,620

(22) Filed: Nov. 16, 2007

(65) Prior Publication Data
US 2008/0141870 A1 Jun. 19, 2008

(30) Foreign Application Priority Data
Dec. 19, 2006 (GB) .................................. 0625240.7

(51) Int. Cl.
*B30B 9/30* (2006.01)
*B30B 15/32* (2006.01)

(52) U.S. Cl. ...................... 100/188 R; 100/43; 100/218
(58) Field of Classification Search .................... 100/7, 100/43, 99, 144, 179, 188 R, 215, 218; 177/136, 177/137, 138, 139, 141, 145
See application file for complete search history.

(56) References Cited

U.S. PATENT DOCUMENTS 5,540,144 A * 7/1996 Schrag et al. ........... 100/188 R
6,248,963 B1 * 6/2001 Gottlober .................... 177/136

* cited by examiner

Primary Examiner—Jimmy T Nguyen
(74) Attorney, Agent, or Firm—Patrick M. Sheldrake; John William Stafer; Michael G. Harms

(57) ABSTRACT

A square baler has a baling chamber and a bale chute arranged at the discharge end of the baling chamber. The bale chute comprises a rear portion that is pivotable about a horizontal axis to allow each bale to be lowered onto the ground without the bale toppling onto its end as it leaves the chute. The invention weighs each bale while the whole of its weight is supported by the rear portion of the bale chute.

15 Claims, 4 Drawing Sheets

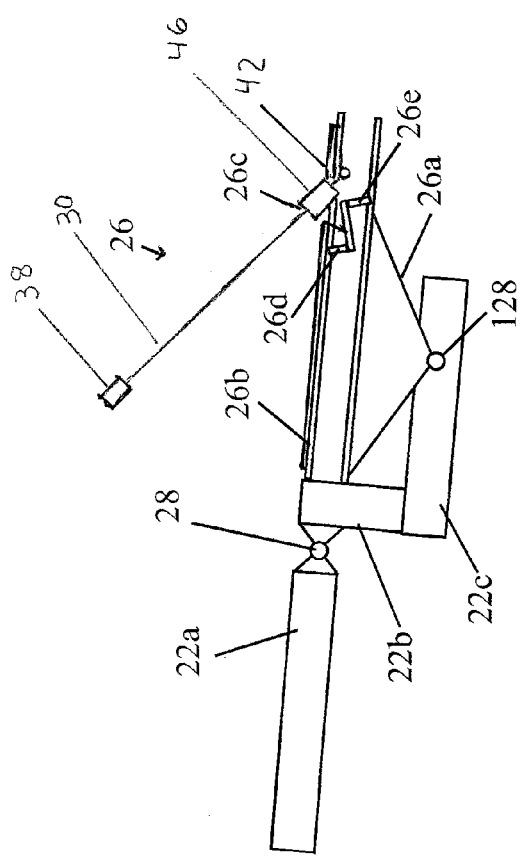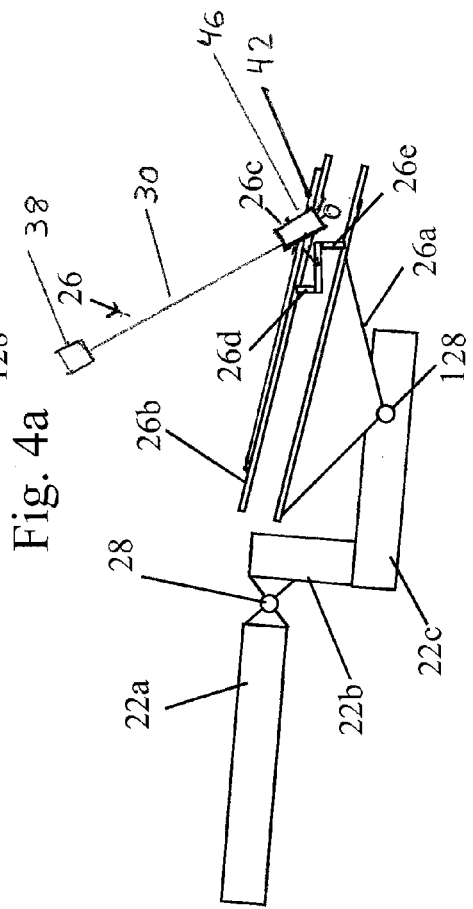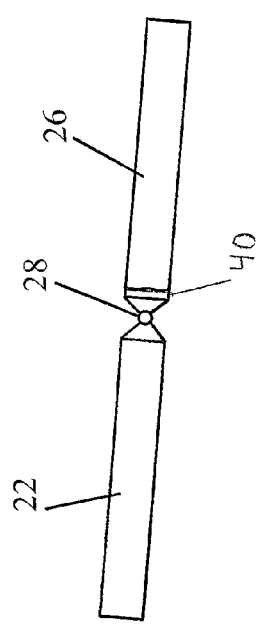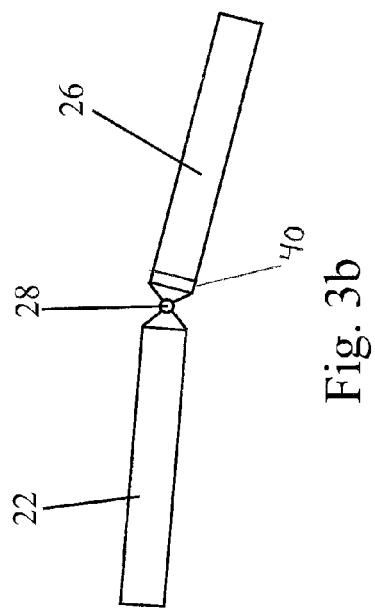

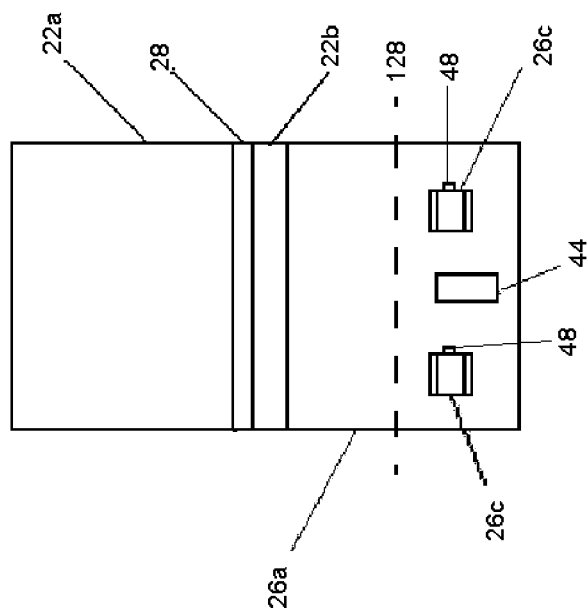

AGRICULTURAL BALERS

FIELD OF THE INVENTION

The present invention relates to an agricultural square baler and is particularly applicable to the weighing of bales as they are discharged from the bale chute of the baler.

BACKGROUND OF THE INVENTION

Conventionally, agricultural square balers are towed on a pair of wheels over a field for picking up hay, straw or silage grass and feeding such crop material to a baling chamber in which it is compressed to parallelepiped packages under action of a plunger which reciprocates inside the baling chamber. When the packages have reached a predetermined length a tying mechanism is operated to encircle the completed package with a plurality of strands to form a finished bale which will be ejected out of the baler.

As the outlet of the baling chamber is at a substantial height above the field and positioned at a certain angle, there is a risk that bales get damaged by their fall from the baling chamber. Bales are commonly damaged because their impact breaks some or all of the strands or because no proper bale drop is ensured, especially with short bales that are left standing on end when the bale is dropped. This problem is often solved by providing a guide or slide means at the exit of the baling chamber for reducing the height from which the bale is released onto the field and/or giving a wanted orientation to the bale. In the art such apparatus usually is referred to as a "bale chute" and examples can be found in WO96/29195 and EP-A-0771522.

EP-0974260, which is believed to represent the closest prior art to the present invention, discloses an agricultural baler having a bale chute which comprises a rear portion that is movable between an upper, bale sustaining, position and a lower, bale discharging, position.

In EP-0974260, the rear portion is pivotable about an axis located at its leading edge so that, as it pivots, its trailing edge is lowered closer to the ground to allow the formed bale to slide off the chute and to be lowered gently onto the ground. In this manner the rear portion can be lowered during the time interval of the actual discharge operation only. During the remainder of the baler operation, the rear portion is kept at a level sufficiently high for precluding collision with the ground.

It is desirable to weigh each bale as it is being discharged from the bale chute. There are various reasons to weigh the bales, such as enabling a farmer to assess the yield of a field and enabling a contractor to charge by the weight of the baled material rather than the number of bales. The density of the bales should also be monitored as it too may need to be controlled.

SUMMARY OF THE INVENTION

The present invention is improved square baler bale chute that provides a reliable measurement of the weight of a bale before it is discharged. A square baler has a baling chamber and a bale chute arranged at the discharge end of the baling chamber. The bale chute has a rear portion that is pivotable about a horizontal axis to allow each bale to be lowered onto the ground without the bale toppling onto its end as it leaves the bale chute, characterised by means for weighing each bale while the whole of its weight is supported by the rear portion of the bale chute.

The present invention is predicated on the realisation that the pivotable rear portion of a bale chute as described in EP-0974260 offers many advantages if it incorporates a weighing mechanism.

It has already been proposed in EP-0978229 to incorporate a weighing mechanism in a bale chute. The bale chute in the latter publication is formed as a roller conveyor of which the last roller is mounted on a frame connected to the remainder of the bale chute by a load beam. As a bale is pushed off the chute, a point is reached when it topples about the last roller and at this time the whole of its weight is supported by the last roller of the conveyor.

This way of measuring the weight of the bales is not reliable for a variety of reasons. It is necessary to take weight measurements while the bale is wholly supported by the rear portion of the bale chute and in practice the time window available for such measurement is very narrow. Because each bale is pushed off the bale chute by the next bale that is still being formed, the bale on the rear portion of the bale chute is only isolated for the very brief time between the instant that it commences to topple and the instant that its rear end touches the ground. As the baler is usually towed over uneven ground, the bale chute is constantly jogged up and down. Even if one is able to identify accurately the time window when weight measurements can be taken, one cannot determine the error in the weight caused by the unevenness of the ground.

The invention mitigates this problem as it provides a longer time window to measure the weight of a bale because it takes longer for a bale to slide down an inclined rear portion of the bale chute, when the inclined rear portion is within a specific angle range, than to topple over the last roller of a conveyor.

In EP-0974260, trailing edge of the rear portion of the bale chute is supported by means of a chain connected to an articulated lever mechanism. The rear portion of the bale chute pivots under the force of the weight of the baler, such that its attitude changes automatically. In its lowered position the rear portion is inclined at a larger angle to the ground, thereby assisting the deposit of the bale and reducing the momentum which might turn over the bale when it hits the ground. In its simplest form, the present invention may be implemented by measuring the tension in the chain supporting the trailing edge of the pivotable rear portion of the bale chute.

The time window during which the weight of a bale can be measured can be increased still further by positioning the pivot axis of the rear portion of the bale chute. It is in particular advantageous for the rear portion to comprise a frame that is pivotable about an axis located below the plane on which the bale slides and offset rearwards from the leading edge of the rear portion.

The repositioning of the pivot axis of the rear portion of the bale chute has the effect that as the rear portion pivots the surface carrying the bale separates from the remainder of the bale chute. This means that the bale being weighed is drawn away from the succeeding bale which is acting to push it off the bale chute, so that its full weight, and only its own weight, acts down on the rear portion of the bale chute.

In the preferred embodiment of the invention, a table over which the bale slides as it is pushed off the chute is mounted for vertical movement relative to the pivot frame, load beams being included in the mounting to determine the weight of the bale resting on the weighing table.

It has also been found that an advantage of the above described geometry is that the rear portion of the bale chute, together with the weighing table, is mechanically decoupled from the remainder of the baler in the horizontal plane and is only constrained to move vertically with the remainder of the baler. This tends to reduce the fluctuations in the measured weight when the baler is towed over uneven ground.

It is difficult in the case of EP 0978229 to know the precise instant when the bale has commenced to topple but has yet to fall onto the ground.

In the preferred embodiment of the invention, this problem is overcome by providing means for measuring the inclination of pivot frame relative to remainder of the bale chute to determine the time window when weight measurements can be taken.

In order to measure correctly, the bale which needs to be weighed needs to be isolated from the surroundings and more particular it needs to be isolated from the adjacent bale which is still being formed in the bale chamber and from the first part of the bale chute. Since the pivot frame is already used to drop the bale at the required angle to ensure a good drop off, this tilting of the pivot frame can be used to release the bale from the next bale and from the first part of the bale chute It is advantageous that weight measurements are only to be taken when the inclination of the pivot frame lies within a predetermined range. A window needs to be created to ensure that sufficient time is available to weigh the bale. When the inclination of the pivot table is minimal, one can not be sure that the bale which needs to be weighed is free from the next bale. If the inclination of the pivot table is too large, the bale will rapidly start to slide down from the pivot table. This window and thus the ideal range depend on the overall construction of the baler such as the angle of the bale chamber relative to the baler frame. In the preferred embodiment of the invention, the range is suitably centred around 14° to the horizontal. As already explained, this determination of the range depends on the inclination of the bale chute. In this embodiment, the bale chute is itself inclined at around 6° to the horizontal, the rear portion should be inclined at approximately 8° to the remainder of the bale chute, typically between 7° and 9°.

To increase the weighing time available when the bale is positioned on the rear portion or pivot table, the movement of the pivot table should be slowed down when the pivot table is inclined between the weighing ranges. The pivot table will only pivot when the centre of gravity of the bale slides over a certain toppling point of the pivot table. Due to the weight of the bale and the inclination of the table, the bale will slide further down the pivot table, thus tilting the table even further until the table hits against stops. The reaction speed of the tilting increases exponential when the distance between the centre of gravity of the bale and the tilting point increases. To slow down the reaction speed of the pivot table, a damper is installed between the chain, which connects the pivot frame to the machine, and the pivot frame itself. It will slow down the movement of the pivot frame due to the sliding of the bale and will stretch the time window which is needed to accurately measure the weight of the bale.

Additionally, this damper has the advantage that when the bale initially is moved onto the pivot table, the weight of the bale will cause the damper to be pushed in a small distance. Since the damper is connected to the pivot frame, it will already cause the pivot table to tilt slightly, without the centre of gravity of the bale passing over the tilting point. This tilting of the table will increase the sliding movement of the bale, making sure that the centre of gravity of the bale reaches the tilting point even sooner and will thus decrease the time needed to isolate the bale from its surroundings and increase the weighing time.

It order to increase still further the time spent by the bale on the weighing table, it is desirable to provide a brake to retard the progress of the bale as it slides off the weighing table. The brake may be a friction brake acting on a roller that forms part of the weighing table or it may comprise a friction element rubbing on a side of the bale as it slides over the weighing table.

Conveniently, the means used for weighing a bale as it is supported on the weighing table comprise two load beams arranged between the weighing table and the pivot frame, one on each side of the table. Comparison of the left and right load beams detects asymmetry in the bale and can be used to provide a left and right indication to assist the driver in steering over the centre of a swath.

Ideally, the load beams are horizontal when the weight measurements are taken and for this reason the load beams are mounted at an angle corresponding to the angle of the rear portion. Again, in the preferred embodiment the angle of inclination is approximately 8° to the support surface of the weighing table.

An additional problem arises when weighing the bale, due to the driving of the baler. The baler is driven over an uneven field which causes the bale to move up and downwards on the bale chute. If the bale is in its weighing position at the moment that the machine drives into a pit, the baler and bale chute will move downwards but due to the inertia, the bale will follow this movement a small fraction later. If the bale hits the weighing table, it will give a wrong indication of the weight if the weighing would then take place.

It is impossible to determine or prevent this from happening and in order to have accurate weighing results, it is necessary to compensate for this. In a preferred embodiment of the present invention, this is done by installing an accelerometer in a transverse direction anywhere on the baler. When the baler is driven in a pit, the baler will suddenly move downward and this will be detected by the accelerometer. The amplitude of the signal will give an indication on how much the weighing signal needs to be compensated. This correction can be done by software. In the preferred embodiment, the accelerometer is placed in between the two load beams at the same level as where the forces are measured.

BRIEF DESCRIPTION OF THE DRAWINGS

The invention will now be described further, by way of example, with reference to the accompanying drawings, in which:

FIGS. 3a and 3b are schematic representations of the bale chute of FIGS. 1 and 2 in its alternative positions, and FIGS. 4a and 4b are similar schematic representations to those of FIGS. 3a and 3b illustrating a preferred embodiment of the present invention.

FIG. 5 is a schematic top plan view of the invention of FIG. 4a with a cutaway view of the pivot frame.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
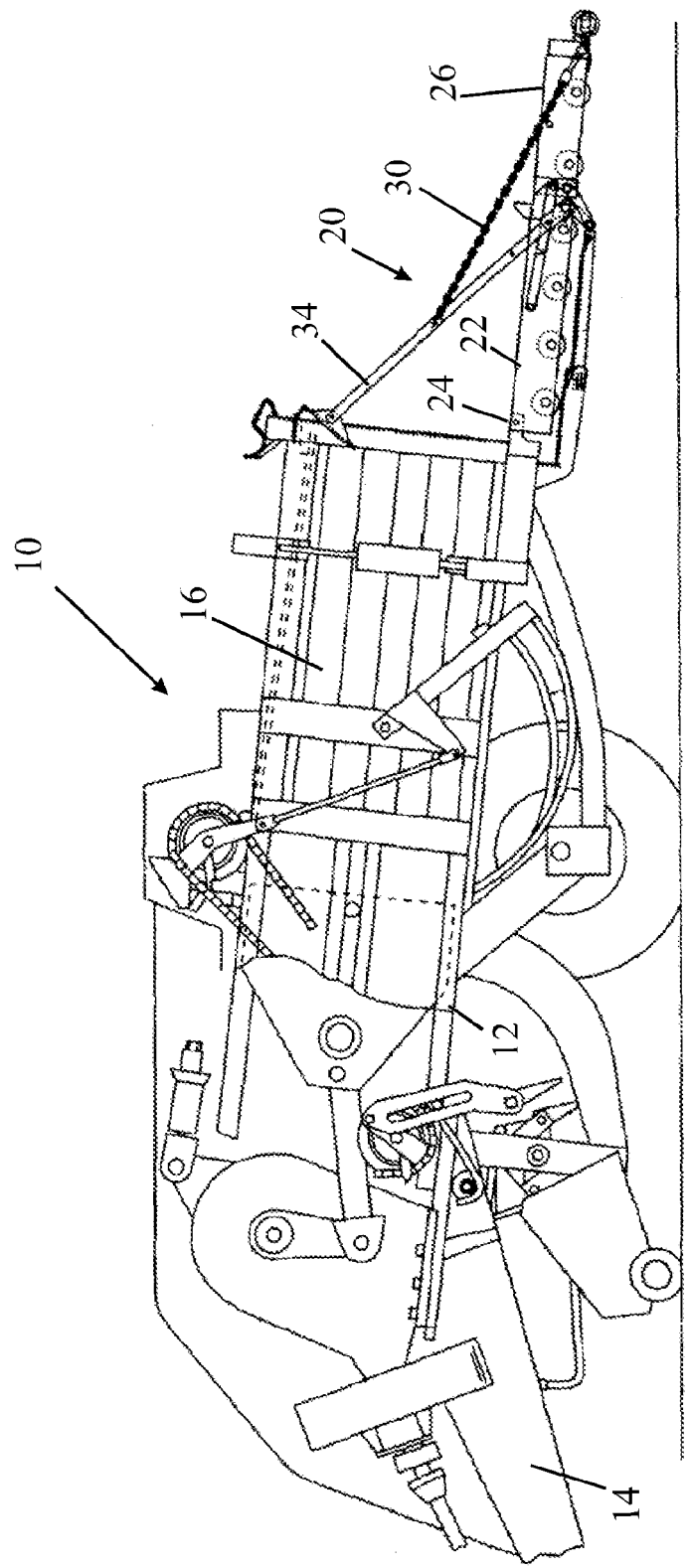
FIG. 1 is a side view of a baler.
Figure 2:
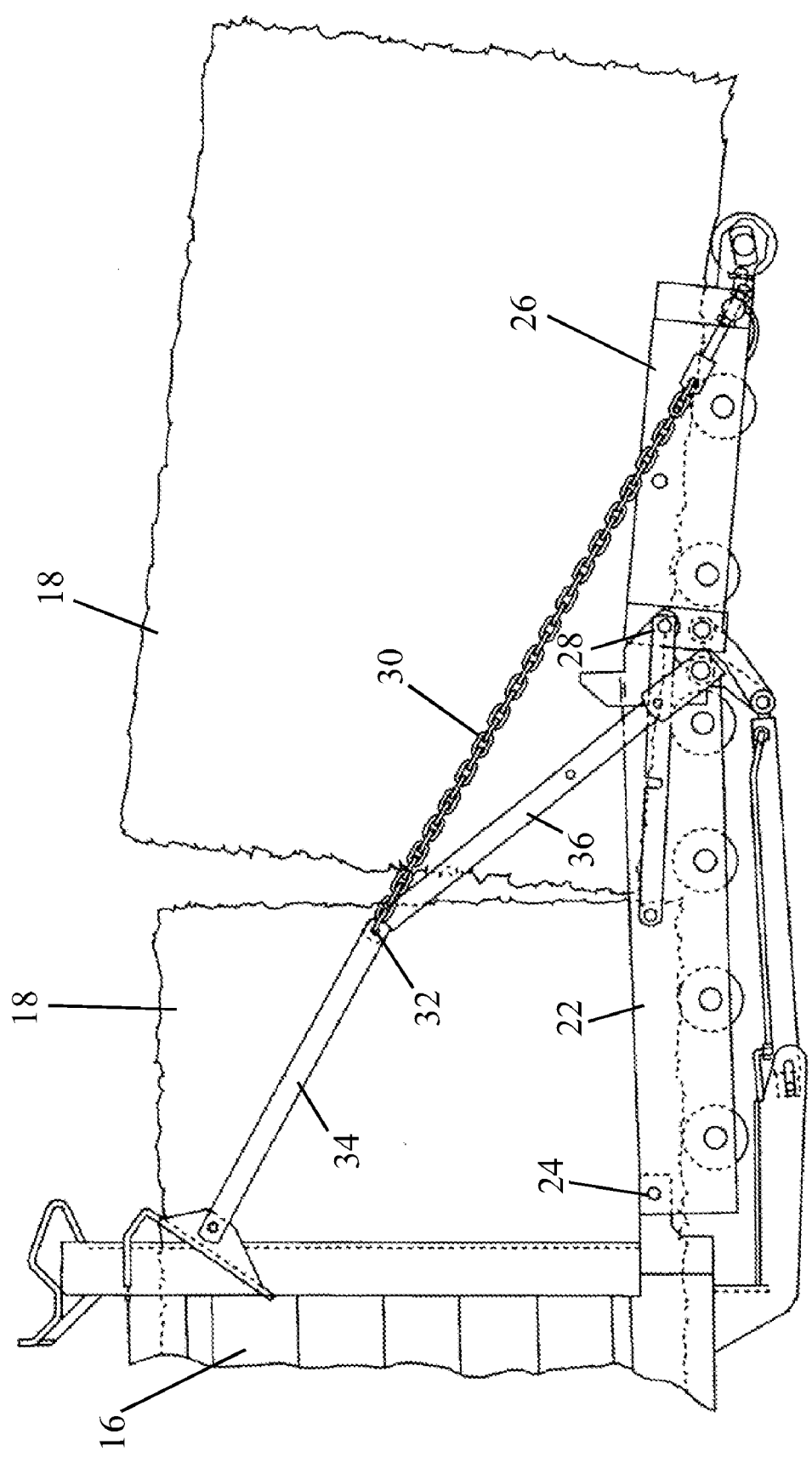
FIG. 2 is a detail of the baler shown in FIG. 1 with the rear portion of the bale chute shown in an alternative position.

FIGS. 1 and 2 of the accompanying drawings are the same as FIGS. 1 and 3, respectively, of the drawings of EP-0974260. In the interest of conciseness, these two figures will only be described herein to the extent necessary for an understanding of the present invention but a more detailed description of both the figures is to be found in the latter published patent specification.

FIGS. 1 and 2 show an agricultural baler 10 comprising a frame 12 which is equipped with a tongue 14 that projects forward to be hitched on to a towing tractor. Square bales are formed and tied in a baling chamber 16 in a conventional manner and the bales 18 (see FIG. 2) are discharged from the rear end of the baling chamber 16 onto a bale chute, generally designated 20.

The discharge chute 20 is formed in two portions, namely a front portion 22 that is pivoted about an axis 24 to the rear end of the frame 12 and a rear portion 26 that is pivotable relative to the front portion 22 about an axis 28. In the unloaded position, shown in FIG. 1, the bale supporting surfaces of both portions 22 and 26 are coplanar and inclined at an angle or approximately 6° to the horizontal. If dropped from a height onto the ground, bales can be damaged and the purpose of the pivoting rear portion 26 is to lower the bales more gently onto the ground.

As can be seen from FIG. 2, when the weight of a bale 18 rests on the rear portion 26 of the bale chute 20, the latter pivots clockwise, as viewed, to lower its trailing end closer to the ground. The bale 18 slides off the rear portion 26 until its rear end touches the ground while the front end of the bale is still supported by the bale chute. As the baler pulls away from the bale, its front end falls off the bale chute without any risk of the bale toppling.

The rear portion 26 of the bale chute is supported on each side of the baler by a chain 30 connected to an elbow joint 32 between two arms 34 and 36 that are articulated to one another. In the raised position of the rear portion 26, shown in FIG. 1, the two arms 34 and 36 are held in a straight line by the weight of the front section 22 of the bale chute 20 and by the next bale 18 which is formed in the bale chamber 16. When the rear portion 26 support the weight of a bale 18, it pivots until the chain 30 lies in line with the arm 34.

The present invention may be implemented most simply by providing a transducer 38 to measure the tension in the chain 30 while the rear portion 26 of the bale chute 20 is in the position shown in FIG. 2. In this position, the rear end of the bale 18 is raised from the front portion 22 of the bale chute and substantially all its weight is supported by the rear portion 26. Because the bale is tilted, there is minimal contact between the bale being weighed and the succeeding bale acting to push it off the bale chute 20. The combination of the two will increase the accuracy of the measured signal and thus the value of the weight of the bale. The chain tension is therefore a reliable indicator of the weight of the bale and there is ample time to take the required measurement because the bale remains supported in this manner from the time that its centre of gravity has passed the point where its weight is sufficient to pivot the rear portion into the inclined position of FIG. 2 until the instant when the rear end of the bale touches the ground. If several measurements are taken, filtering may be used to minimise errors caused by the bale chute being jogged up and down as the baler 10 is towed over uneven ground.

Instead of or in combination with measuring tension in the chain 30, it would be alternatively possible to employ a load beam in the coupling between the rear and front portions of the bale chute.

FIGS. 3a and 3b show how the arrangement that has been described by reference to FIGS. 1 and 2 may be represented schematically. FIG. 3a corresponds to the position shown in FIG. 1 in which the two portions 22 and 26 of the bale chute are in line with one another and FIG. 3b corresponds to the position shown in FIG. 2. Using similar schematic representations, FIGS. 4a and 4b show an alternative, and preferred, embodiment of the invention.

The portion 22a of the bale chute of FIGS. 4a and 4b corresponds to the portion 22 in FIGS. 3a and 3b. However, instead of the portion 26 being pivoted about an axis 28 near the edge of the bale support surface of the front portion 22, the tilting axis 128 of the pivot table is mounted on a frame made up of limbs 22b and 22c that are connected to portion 22a. The axis or tilting point 128 now lies beneath the bale support surface of the rear portion 26. The axis 28 is now only used to move the rear portion of the chute into the transport position.

As can be seen from FIGS. 4a and 4b, the weighing table 26b is asymmetrical having a larger surface after the tilting point 128. This asymmetrical design has the advantage that the available contact surface, once the centre of gravity of the bale is over the tilting point 128, is sufficiently long to allow a correct measuring. If this distance would be shorter, a correct measuring could also be achieved, if the bale could be significantly slowed down to allow a sufficient time interval in which the bale can be weighed. Additionally, due to the difference in length of the weighing table 26b before and after the tilting point 128, the extra weight of the weighing table 26b after the tilting point 128 will help in tilting the table 26b, even when the centre of gravity of the bale has just passed the tilting point 128, thus freeing the bale sooner from the next bale in the baling chamber 16.

The rear portion 26 of the bale chute 20 is formed in this embodiment of a pivot frame 26a which, as its name implies, pivots about the axis 128. A separate weighing table 26b is supported on the pivot frame 26a by means of two load beams 26c (arranged one on each side of the weighing table). As already mentioned above, the weighing table has an asymmetrical design and in the preferred embodiment the distance before the tilting point 128 is 1 to 3, whereas the distance after the tilting point 128 is 2 to 3. Mountings 26d and 26e connect the load beams 26c to the weighing table 26b and the pivot frame 26a in such a manner that the load beams are horizontal in the ideal weighing position as shown in FIG. 4b. The ideal window in which the bale can be weighed is when the centre of gravity is above the load beams 26c and the bale is isolated on the weighing table. As can be seen from FIGS. 4a and 4b, the load beams are located near the end of the weighing table 26b. If the load beams 26c would be in the centre of the weighing table, it would not change the range in which the bale is isolated and ready to be weighed. However, the error on the measuring signal will be higher because of the momentum created on the load beams 26c due to the distance between the bale's centre of gravity and the load beams 26c. If the load beams 26c are above the tilting point 128, the error can be as much as 5%.

It is therefore important that the load beams 26c are located such that they are horizontal in the positioning range where the bale can be weighted, thus when the weighing table is within a specific inclination range as will be described further down.

One can see from a comparison of FIGS. 4a and 4b that two displacements of the bale occur when the rear portion of the bale chute pivots into the bale discharging position. First, the entire weighing table moves away from the front portion 22 creating a separation in the direction of discharge of the bales between the bale resting on the rear portion and the succeeding bale acting to push it off the bale chute. Second, the rear edge of the weighing table rises above the plane of the bale support surface so that the end of the bale resting on the rear portion 26 is raised off the front portion 22. In this way, the bale to be weighed is fully isolated to ensure that all of its weight (and nothing else) acts down on the weighing table. It is important that the further pivoting of the weighing table is slowed down as much as possible, to increase the time interval where it is possible to measure the weight of the bale. The weighing table 26 will only pivot when the centre of gravity of the bale slides over a certain toppling point 128. Due to the weight of the bale and the inclination of the table 26, the bale will slide further down the weighing table, thus tilting the table even further until the table hits against stops. The reaction speed of the tilting increases exponential when the distance between the centre of gravity of the bale and the tilting point increases. To slow down the reaction speed of the pivot table, a damper 46 is installed between the chain 30 and the rear portion of pivot frame 26 of the bale chute. It will slow down the movement of the weighing table 26 and will stretch the time window which is needed to accurately measure the weight of the bale.

Additionally, this damper 46 has the advantage that when the bale initially is moved onto the weighing table, the weight of the bale will cause the damper 46 to be pushed in for a small distance. Since the damper 46 is connected to the pivot frame 26a of the bale chute, it will cause the weighing table to tilt already a bit, without the centre of gravity of the bale passing over the tilting point 128. This tilting of the table will increase the sliding movement of the bale, making sure that the centre of gravity of the bale reaches the tilting point even sooner and will thus decrease the time needed to isolate the bale from its surroundings. As soon as the centre of gravity of the bale passed the tilting point 128, the damper 46 will start to damp the tilting action of the weighing table to slow down the movement of the weighing table to its drop off position and in that way increase the measuring time.

In addition to all the above advantages, the damper 46 will also damp the vibrations which occur when driving the machine over the field.

A further advantage of this geometry is that accelerations in the fore and aft directions of movement are decoupled from the weighing table and only vertical accelerations will affect the weight measurements indicated by the load beams 26c. These vertical accelerations can be compensated by installing an accelerometer 44 in a transverse direction anywhere on the baler. If the baler is driven over an uneven field and the bale is in its weighing position at the moment that the machine drives into a pit, the baler and bale chute will move downwards but due to the inertia, the bale will follow this movement a small fraction later. If the bale hits the weighing table, it will give a wrong indication of the actual weight of the bale.

If the baler is driven in a pit, the baler will suddenly move downward and this will be detected by the accelerometer. The amplitude of the signal will give an indication on how much the weighing signal needs to be compensated. This correction can be done by software. In the preferred embodiment, the accelerometer 44 is placed in between the two load beams at the same level as where the forces are measured, as shown in FIG. 5.

Because two load beams are provided, it is possible to compare the weights using sensors 48 indicated by the left and right load beams 26c. Any detected asymmetry in the bale can be used to provide a left and right indication to assist the driver in steering over the centre of the swath.

Means to measure the inclination, such as inclination sensors 40 mounted between the weighing table 26 and the pivot frame 22, as shown schematically in FIGS. 3a and 3b, provide an indication of when weight measurements can be taken, the weight of the bale being fully supported by the rear portion of the bale chute only in a specific inclination range which, as mentioned earlier, depends on the overall design of the baler such as e.g. the angle of the bale chamber. In the preferred embodiment, the relative inclination is between 7° and 9°, this corresponding to an inclination to the horizontal of 13° to 15°. It is advantageous for weight measurements only to be taken when the inclination of the pivot frame lies within this specific inclination range.

26a

Though shown as a flat surface in the schematic representation of FIGS. 4a and 4b, the weighing table may be formed of a roller conveyor and it is preferred to fit a friction brake to one of the rollers of the conveyor to prolong the time during which the weight of the bale is supported by the rear portion of the bale chute. In place of a brake acting on a roller, a replaceable friction pad 42 or edge may be included in the support surface to rub against one or more side of the bale. The replaceable friction pad 42 may be changed depending on the differences in crop and/or crop conditions.

In use, the weight sensed by the load beams is monitored during the time that the weighing table is sensed to be inclined in a specific inclination range such as 7° and 9° to the rear portion of the bale chute. Several reading may be taken during this time and processed to eliminate errors caused by vertical accelerations. The weight determined by the load beams on the opposite sides of the baler are summed to determine the total weight of each bale. If desired, the difference between the two measurements can be given to the driver to indicate imbalance in the bale, normally resulting from the baler not being properly centred on the swath that is being gathered. This asymmetry indication allows the driver to apply the necessary steering correction.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

The invention claimed is:

1. A square baler comprising:
    a baling chamber;
    a bale chute having a front portion and a rear portion, the bale chute is pivotally connected at a discharge end of the baling chamber, and the bale chute is configured to unload a bale from the baling chamber to a ground;
    the rear portion connected at a first pivot point to the front portion about a horizontal axis;
    the rear portion having a pivot frame that is pivotable about an axis located below a plane on which the bale slides and offset rearwards from the first pivot point; and
    a bale weighing device having a weighing table connected to a top portion of the pivot frame for weighing the bale while the full bale weight is supported by the rear portion of the bale chute and the weighing table having a friction brake comprises a friction element for rubbing on at least one side of the bale as the bale slides over the weighing table.

2. The baler of claim 1, wherein the bale weighing device comprises a transducer measuring the tension in a chain connected to the rear portion of the bale chute.

3. The baler of claim 1, wherein the bale slides over the weighing table as it is pushed off the bale chute, wherein the bale weighing device is at least one load beam mounted to the table to determine the weight of the bale resting on the weighing table.

4. The baler of claim 3, further comprising an inclination detector for measuring the inclination of the pivot frame relative to remainder of the bale chute to determine a time window when weight measurements can be taken.

5. The baler of claim 4, wherein the weight measurements are taken only when the inclination of the pivot frame lies within a predetermined range.

6. The baler of claim 5, wherein the predetermined range is centred around 14° to the horizontal.

7. The baler of claim 3, wherein the friction brake is configured to increase the time spent by the bale on the weighing table.

8. The baler of claim 3, wherein the bale weighing device comprises two load beams arranged between the weighing table and the pivot frame.

9. The baler of claim 8, wherein the load beams are mounted at a specific angle to the support surface of the weighing table so as to be substantially horizontal when the weight measurements are taken.

10. The baler of claim 9, wherein the specific angle of the load beams is between 7° and 9° degrees to the support surface of the weighing table.

11. The baler of claim 8, further comprising at least one sensor configured for comparing the weights measured by the load beams on the opposite sides of the baler, the sensors configured to transmit a left and right indication to assist the driver in steering over the centre of a swath.

12. The baler of claim 1, further comprising mechanism configured to tilt the pivot frame when the bale is pushed onto the plane before the centre of gravity of the bale is over the tilting point of the pivot frame.

13. The baler of claim 11, wherein the mechanism is a damper, connected between the pivot frame and a chain, the chain connecting the pivot frame to the baler, wherein the damper damps the pivoting movement of the pivot frame when the centre of gravity of the bale is over the tilting point of the pivot frame.

14. The baler of claim 1, further comprising measuring device configured to detect vertical accelerations of the baler, wherein the baler compensates for the vertical accelerations when determining an actual bale weight.

15. The baler of claim 14, wherein the measuring device is an accelerometer.

* * * * *